(12) United States Patent
Low et al.

(10) Patent No.: US 8,005,718 B2
(45) Date of Patent: *Aug. 23, 2011

(54) INK CARTRIDGE VENDING MACHINE

(75) Inventors: Tong-Nam-Samuel Low, Singapore (SG); Yu Zhao, Singapore (SG); Poovendhran S/O Kannayah, Singapore (SG); Ling Hwee Vincent Ong, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,817

(22) Filed: Jun. 4, 2010

(65) Prior Publication Data

US 2010/0241505 A1 Sep. 23, 2010

Related U.S. Application Data

(62) Division of application No. 11/552,518, filed on Oct. 24, 2006, now Pat. No. 7,761,331.

(51) Int. Cl.
*G06F 17/60* (2006.01)
(52) U.S. Cl. ............... 705/16; 705/14.23; 705/14.28; 705/64; 235/7 R; 186/1
(58) Field of Classification Search ............ 705/16
See application file for complete search history.

(56) References Cited

U.S. PATENT DOCUMENTS

| 6,851,797 | B2 | 2/2005 | Suda et al. | |
|---|---|---|---|---|
| 6,973,943 | B2 | 12/2005 | Sesek et al. | |
| 2002/0105565 | A1* | 8/2002 | Suda et al. | 347/85 |
| 2002/0156683 | A1 | 10/2002 | Stoutenburg et al. | |
| 2003/0081044 | A1* | 5/2003 | Gomez et al. | 347/23 |
| 2005/0034777 | A1* | 2/2005 | Nicodem et al. | 141/2 |
| 2008/0195247 | A1 | 8/2008 | Mallett et al. | |

FOREIGN PATENT DOCUMENTS

JP 02004268516 A * 9/2004

OTHER PUBLICATIONS

Phoenix Ink (http://www.phoenix-ink.com/). No date available. Retrived online Apr. 5, 2011.*

* cited by examiner

*Primary Examiner* — James A Reagan (57) ABSTRACT

A vending machine capable of refilling used ink cartridges as well as dispensing filled ink cartridges is closed. The vending machine includes at least one cartridge receptacle for receiving an ink cartridge, a user interface, a display unit, a nozzle health check module, a printhead servicing module, an ink reservoir, an ink refilling unit, a compartment containing new ink cartridges, a compartment containing filled, second-hand ink cartridges, and a recycle compartment for receiving discarded ink cartridges. The user is presented by the display unit with the option of (a) refilling a used cartridge, (b) purchasing a filled cartridge, or (c) returning a used cartridge in exchange for a purchase rebate or a discount voucher. When the user selects the option of refilling, the vending machine executes a refilling subroutine which includes checking the nozzle health.

20 Claims, 6 Drawing Sheets

INK CARTRIDGE VENDING MACHINE

RELATED APPLICATION

This is a divisional application of U.S. patent application Ser. No. 11/552,518, filed Oct. 24, 2006 now U.S. Pat. No. 7,761,331, titled "INK CARTRIDGE VENDING MACHINE," which application is assigned to the assignee of the present invention and the entire contents of which are incorporated herein by reference.

FIELD OF THE INVENTION

The present invention generally relates to a vending machine for refilling and vending ink cartridges.

BACKGROUND

Inkjet printing devices, such as plotters, facsimile machines and inkjet printers, print images using ink. These printing devices are provided with ink cartridges, often called "pens," for ejecting drops of ink onto a sheet of print media. Each ink cartridge has an ink reservoir and a printhead with a plurality of small nozzles through which the ink drops are ejected. Because printing consumes the ink in the ink cartridge, the cartridge must be replaced or refilled when the cartridge is out of ink. Some users simply buy new ink cartridges when the cartridges are emptied. Ordering a new cartridge from the manufacturer may be expensive, time consuming and inconvenient. Some other users attempt to refill the empty cartridge with a new supply of ink using cartridge refilling kits. However, these cartridge refilling kits are often messy. Furthermore, the users may incorrectly fill the cartridge with the wrong ink or attempt to use the cartridge beyond its useful life. Incorrect refilling and using an ink cartridge that is beyond its useful life lead to unsatisfactory printing output and/or damage to the printing devices.

SUMMARY

The present invention provides a vending machine capable of refilling used ink cartridges as well as dispensing filled ink cartridges. The vending machine includes at least one cartridge receptacle for receiving an ink cartridge, a user interface, a display unit, a nozzle health check module, a printhead servicing module, an ink reservoir, an ink refilling unit, a compartment containing new ink cartridges, a compartment containing filled, second-hand ink cartridges, and a recycle compartment for receiving discarded ink cartridges. The user is presented by the display unit with the option of (a) refilling a used cartridge, (b) purchasing a filled cartridge, or (c) returning a used cartridge in exchange for a purchase rebate or a discount voucher. When the user selects the option of refilling, the vending machine executes a refilling subroutine which includes checking the nozzle health.

The objects and advantages of the present invention will become apparent from the detailed description when read in conjunction with the drawings.

DETAILED DESCRIPTION

The present invention provides a vending machine that presents to a user, i.e., a customer, with the option of: (a) refilling a used cartridge, (b) purchasing a new or second-hand cartridge, or (c) returning a used cartridge in exchange for a purchase rebate or a discount voucher. The vending machine can implement a refilling routine which includes checking the nozzle health prior to refilling, and servicing the printhead to recover malfunctioning nozzles if the printhead has not been serviced before.

Figure 1:
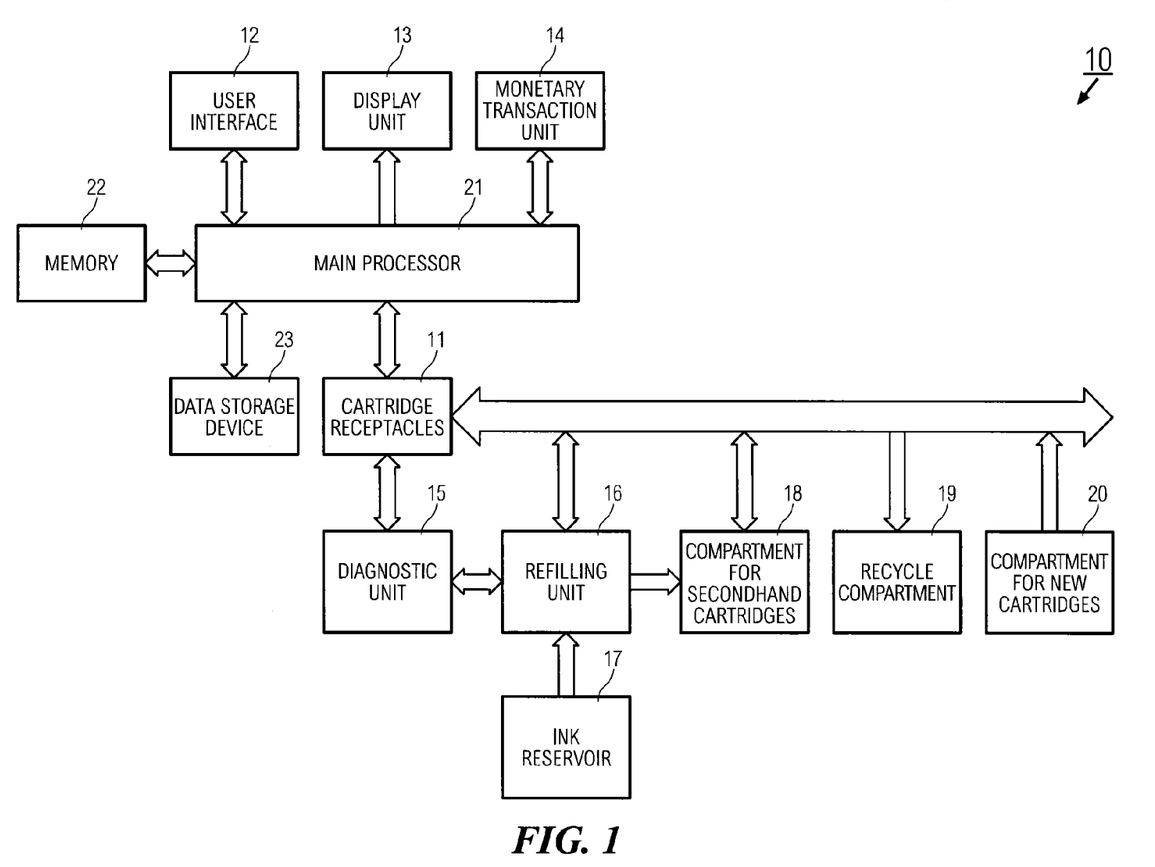
FIG. 1 is a diagram showing the components of a vending machine according to an embodiment of the present invention.

FIG. 1 is a diagram showing the components of the vending machine according to an embodiment of the present invention. Referring to FIG. 1, the vending machine 10 includes a plurality of cartridge receptacles 11 for receiving different types of ink cartridges, a user interface 12, a display unit 13, a monetary transactional unit 14, a diagnostic unit 15, an ink refilling unit 16, an ink reservoir 17 containing various types of ink, a compartment 18 for receiving and storing filled, second-hand ink cartridges, a recycle compartment 19 for receiving discarded ink cartridges, and a compartment 20 containing new ink cartridges. The vending machine 10 further includes a main processor 21 coupled to a memory 22 (e.g. RAM). The processor 21 is also coupled to a data storage device 23 (e.g. HDD).

In one embodiment, the cartridge receptacles 11 are configured as slots, each of which is shaped to snugly receive a particular type of ink cartridge. From hereon the cartridge receptacles 11 will be referred to as "slots," although it should be understood by those skilled in the art that other configurations are possible for the cartridge receptacles. Because there are different types of ink cartridges with various configurations, the slots are shaped to accommodate various configurations of ink cartridges. During a refilling process, ink is added to the cartridge through an inlet port in the cartridge. Each slot is configured such that, when an ink cartridge is properly positioned in the slot, the nozzles are accessible for nozzle health check and the inlet port is accessible for refilling.

The display unit 13 is configured to present to a user with choices of services and products, and display relevant information about these services and products. The display unit 13 may include a conventional CRT or liquid crystal display. The customer can interact with the vending machine via the user interface 12, which may be a touch-actuated input mechanism such as keys, buttons, or a mouse. Alternatively, the user interface 12 may be a touch screen display panel, which is an integral part of the display unit 13.

The monetary transactional unit 14 is configured to process payments, calculate rebates and issue vouchers. The transactional unit 14 includes mechanisms for accepting payments, either cash or card, and dispensing change. The mechanism for accepting payments may include a credit/debit card reader and a slot for accepting cash. The transactional unit further includes a printing device for printing payment receipts and vouchers.

Before refilling a used cartridge, the nozzle health of the cartridge is checked and the nozzles are serviced if necessary by the diagnostic unit 15. The diagnostic 15 includes a nozzle health check module, which will be described subsequently with reference to FIG. 2, and a printhead servicing module. The printhead servicing module includes mechanisms for cleaning the printhead. Cleaning includes wiping the printhead, clearing the clogged nozzles, and dissolving ink clots in the clogged nozzles using a treatment fluid, such as polyethylene glycol (PEG).

The ink refilling unit 16 is in communication with the ink reservoir 17 and includes mechanism for transferring ink from the ink reservoir 17 to the inlet port of the cartridge being refilled. The ink reservoir 17 may contain reservoirs of different types of ink that are available to the refilling mechanism.

The compartment 18 is configured to receive and store second-hand cartridges that have been refilled and ready to be dispensed. The recycle compartment 19 is configured to receive discarded cartridges that have been determined to be non-refillable. The compartment 20 contains a supply of new cartridges that can be purchased at the vending machine 10.

The data storage device 23 stores data relevant to the operation of the vending machine, such as data relating to the manufacture of the cartridges, diagnostic records, the number of times a particular cartridge has been refilled, the quantity and the condition of the cartridges that are in the vending machine. The data storage device 23 also stores the program instructions for a refilling subroutine, a recycling subroutine and a purchasing subroutine in accordance with the present invention. The program instructions are stored in the data storage device 23 until the processor 21 retrieves the program instructions during operation and store them in the memory 22. The processor then executes the program instructions to implement the subroutines.

Figure 2:
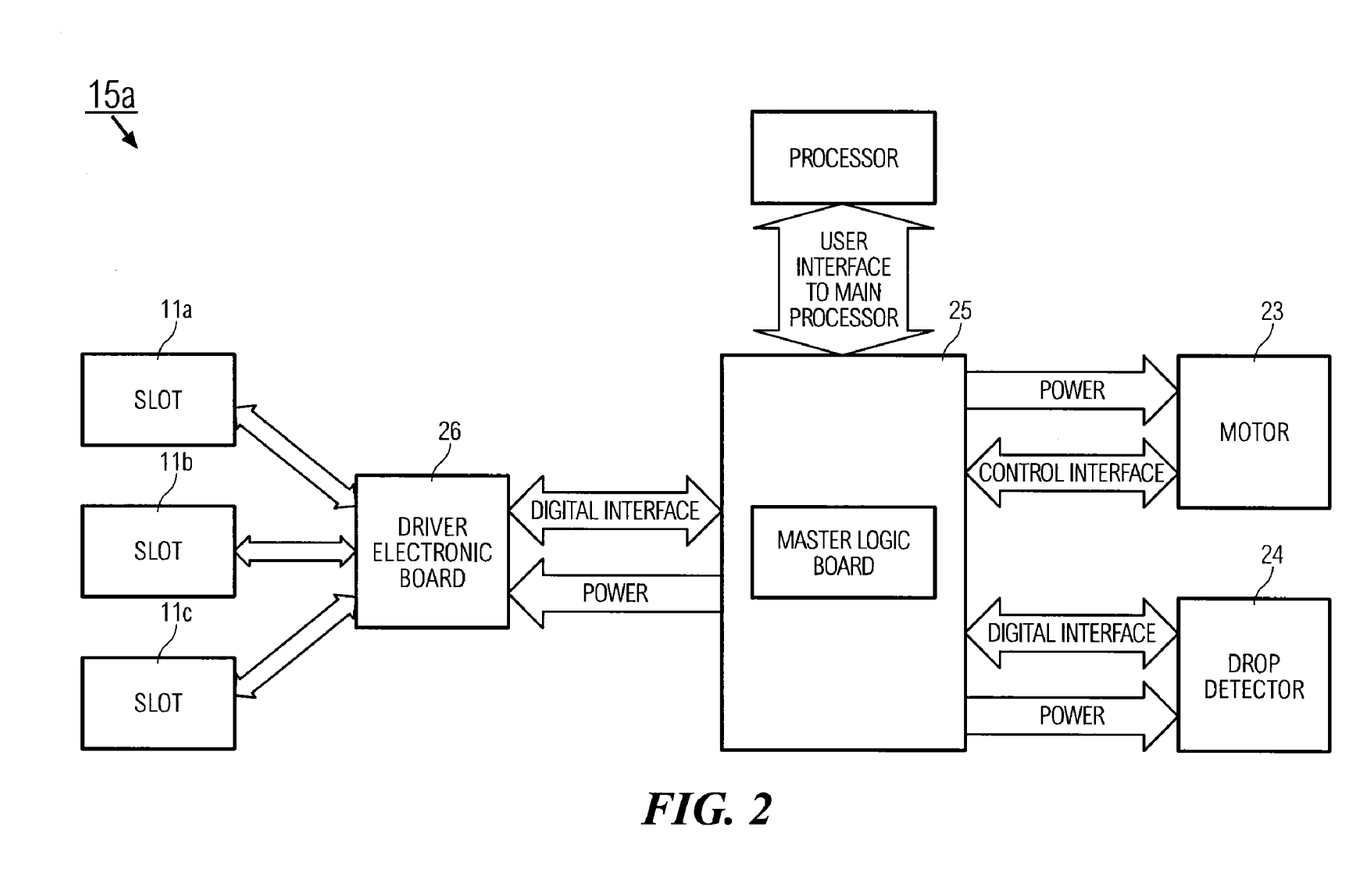
FIG. 2 shows the components of a nozzle health check module according to an embodiment of the present invention.

FIG. 2 illustrates the major components of the nozzle health check module 15a of the diagnostic unit 15 in accordance with an embodiment of the present invention. The nozzle health check module 15a includes a drop detector 23 and a motor 24 for moving the drop detector to a properly aligned position below the nozzles of the cartridge being analyzed. In this respect, each cartridge slot may be configured so that the nozzles of a cartridge face downward when the cartridge is inserted into the slot. The drop detector 23 may be any suitable drop detector that is known to those skilled in the art. Examples of suitable drop detectors include the drop detectors described in U.S. Pat. No. 6,238,112 and U.S. Pat. No. 6,086,190, both of which are currently assigned to the present assignee, Hewlett-Packard Company. The disclosures of these patents are hereby incorporated by reference. The nozzle health check module 15a further includes a master logic board 25 interfacing with a driver electronic board 26 (e.g., a printed circuit board), the drop detector 24 and the motor 23. The master logic board 25 is also in communication with the processor 21 via an USB interface. The master logic board 25 is configured to provide the central control for the nozzle health check process, including controlling the functionality of the drop detector 24, the motor 23, and the driver electronic board 26, and processing output signals from the drop detector 24. The driver electronic board 26 is in communication with the cartridge slots 11a-11c so as to enable firing of the nozzles of the cartridge being inserted. In one embodiment, a spring-type electrical connector is arranged in each cartridge slot, such that, when a cartridge is inserted into the appropriate slot, the spring-type electrical connector comes into contact with the electrical pads on the printhead. The electrical pads become accessible to the driver electronic board 26 through the spring-type electrical connector. By this arrangement, the driver electronic board 26 can cause the nozzles of a cartridge to spray ink droplets onto the drop detector 24 in response to certain commands from the master logic board 25. Three cartridge slots 11a-11c are shown in FIG. 2 for illustration, but it should be understood by those skilled in the art that any number of slots is possible.

During nozzle health check, the master logic board 25 sends instruction to the driver electronic board 26 to detect the type of cartridge being inserted. This detection is accomplished by detecting which slot is holding the cartridge. Subsequently, the motor 23 moves the drop detector 24 to the proper position under the inserted cartridge, and the driver electronic board 26 commands the nozzles of the cartridge to spray ink droplets onto the drop detector 24. Subsequently, the drop detector 24 performs drop detection, and sends detection signals to the master logic board 25 for signal processing to determine if any of the nozzles is malfunctioned. The nozzle health is determined based on the number of malfunctioning, i.e. "bad," nozzles, as well as the cluster location of the bad nozzles.

Figure 3:
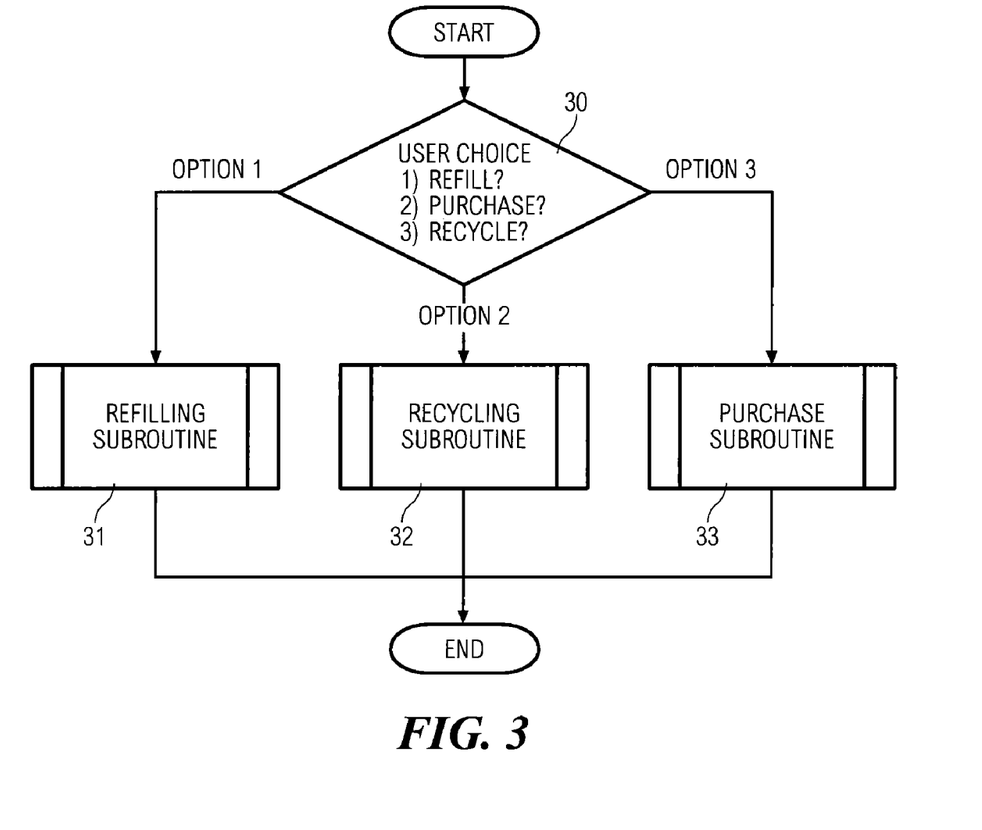
FIG. 3 is a flowchart illustrating a method of operating the vending machine of FIG. 1 according to an embodiment of the present invention.

FIG. 3 is a flowchart illustrating a method of operating of the vending machine 10 according to an embodiment of the present invention. The method begins at step 30 with the user choosing one of the following services: (1) refilling a used cartridge, (2) purchasing a filled cartridge, or (3) recycling a used cartridge. These options are presented to the user at the display unit 13 when the user walks up to the vending machine 10. If option 1 is selected by the user, the machine proceeds to the refilling subroutine 31. If option 2 is selected, the machine proceeds to the recycling subroutine 32. If option 3 is selected, the machine proceeds to the purchase subroutine 33.

Figure 4:
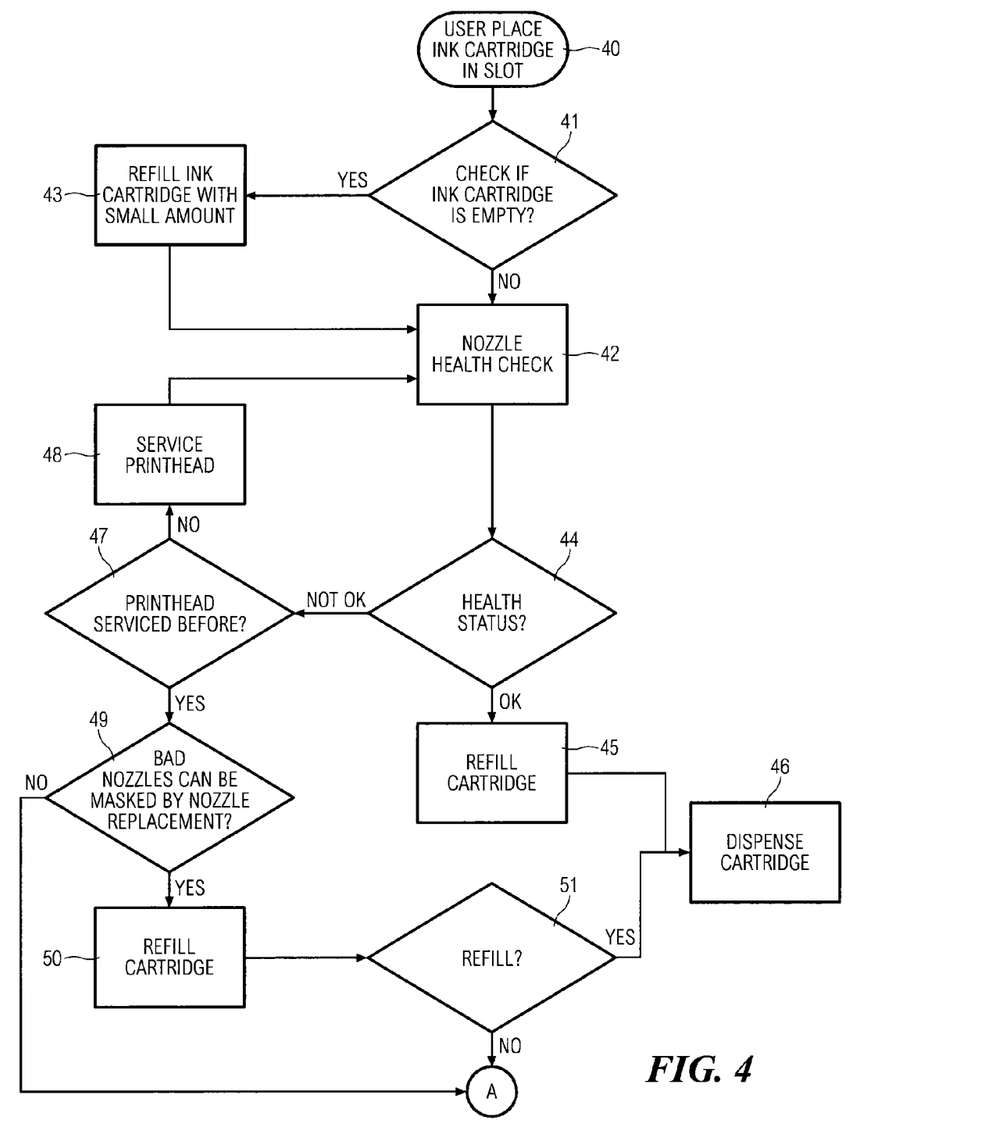
FIG. 4 is a flowchart illustrating a refilling subroutine according to an embodiment of the present invention.

An embodiment of the refilling subroutine is illustrated by the flowchart in FIG. 4. The refilling subroutine starts with the user inserting a used ink cartridge into an appropriate cartridge slot (step 40). The diagnostic unit 15 then checks whether the cartridge is totally empty of ink (step 41). If the cartridge is not empty, the nozzle health check module 15a of the diagnostic unit 15 performs a nozzle health check procedure to determine the health status of the nozzles (step 42). The nozzle health check procedure includes causing the nozzles to spray ink droplets onto the drop detector and performing drop detection to check if any of the nozzles is malfunctioned. If the cartridge is empty, the refilling unit 16 is activated to fill the cartridge with a small amount of ink, e.g. 10% of the full ink level, (step 43) before the nozzle health check procedure at step 42 is carried out. At step 44, the nozzle health check module determines the nozzle health status by determining whether the number of bad nozzles in a certain cluster is greater than a threshold number. If the nozzle health is ok, then refilling of the cartridge is performed by the refilling unit 16 at step 45 and the filled cartridge is dispensed at step 46. On the other hand, if the nozzle health is not ok, i.e., number of bad nozzles in a certain cluster is greater than a threshold number, then the diagnostic unit 15 checks whether the cartridge has been serviced before (step 47). The servicing history of the cartridge can be determined based on the information recorded in the data storage device 23. If the cartridge has not been serviced before, the servicing module proceeds to perform automatic servicing to recover the bad nozzles (step 48). After printhead servicing, the machine returns to the nozzle health check at step 42.

If the cartridge has been serviced before, the diagnostic unit 15 determines whether the bad nozzles can be masked by nozzle replacement based on the location of the bad nozzles (step 49). Nozzle replacement involves an error hiding process whereby, during printing, good nozzles are reused to spray a predetermined sequence of ink droplets in the place of non-functioning nozzles, thereby maintaining the print quality in absence of the non-functioning nozzles. If the answer at step 49 is "yes," the cartridge is refilled with ink at step 50. Subsequently, at step 51, the user is notified that the cartridge is reusable but the print quality would be degraded, and is prompted to decide whether the user still wants to proceed with refilling. If the user selects to refill, the refilled cartridge is dispensed (step 46). On the other hand, if the user decides against refilling and selects "no" to refilling, the vending machine proceeds to the recycling subroutine shown in FIG. 5. If the answer at step 49 is "no," i.e., the cartridge is not reusable, the vending machine proceeds directly to the recycling subroutine shown in FIG. 5.

Figure 5:
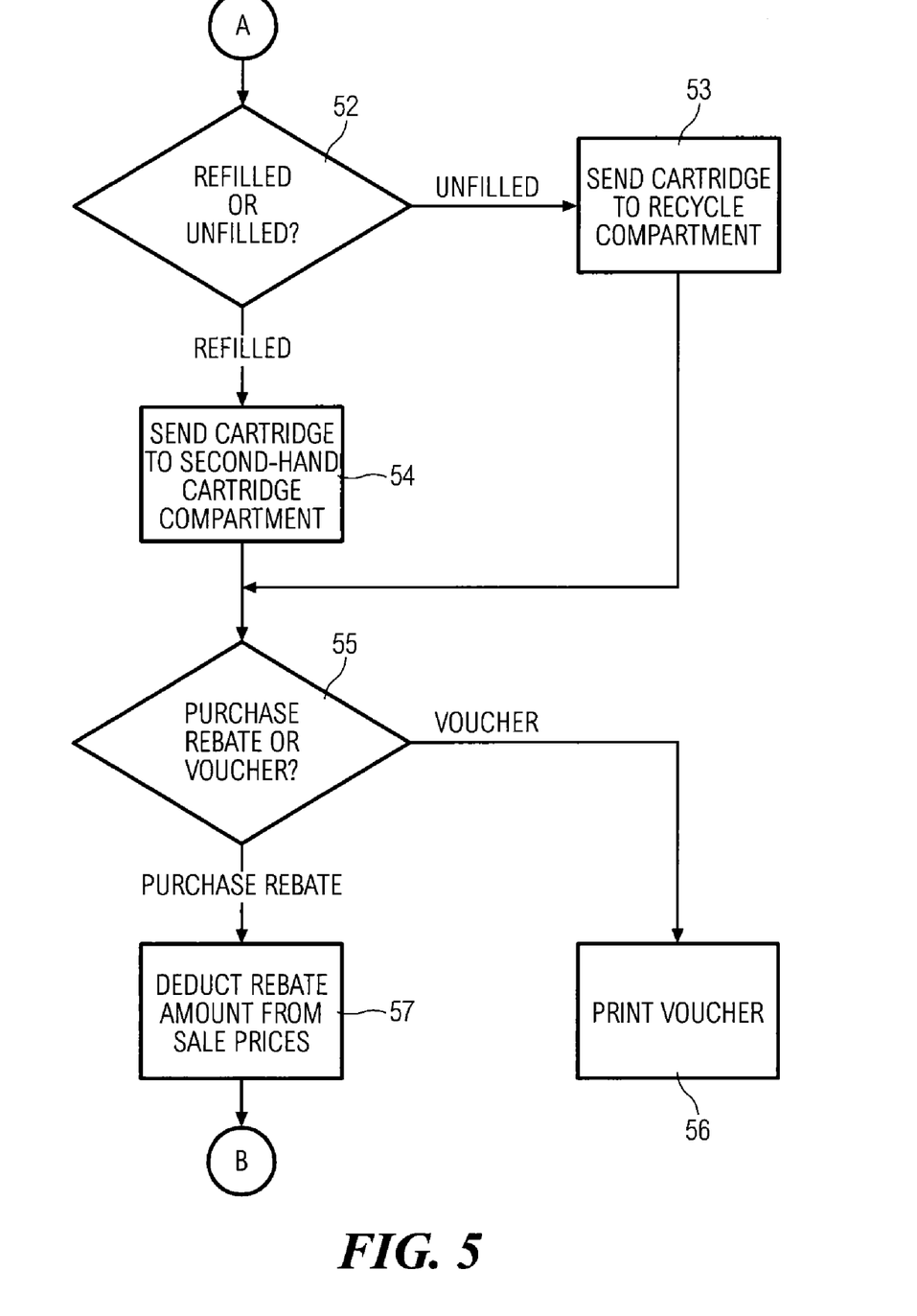
FIG. 5 is a flowchart illustrating a recycling subroutine according to an embodiment of the present invention.

Referring to FIG. 5, the recycling subroutine starts with determining whether the cartridge inserted in the slot is a used, unfilled cartridge or a refilled cartridge (which has been refilled during the refilling subroutine) (step 52). If the cartridge is unfilled, the unfilled cartridge is sent to the recycle compartment 19 (step 53). If the cartridge has been refilled, the refilled cartridge is sent to the second-hand compartment 18. Subsequently, at step 55, the user is given a choice of receiving a purchase rebate or a discount voucher in exchange for the used cartridge (step 55). This choice is presented at the display unit 13. If the user selects voucher, a voucher is printed and dispensed by the monetary transactional unit 14 (step 56). If the user selects purchase rebate, the transactional unit 14 deducts the rebate amount from the sale prices of cartridges available for purchase (step 57). The vending machine then proceeds to the purchase subroutine shown in FIG. 6.

As an option, the recycling subroutine may be modified to include the step of checking the nozzle health of a newly inserted, unfilled cartridge, which has not gone through the refilling subroutine, in order to determine whether the cartridge is reusable before sending it to the recycle compartment 19. If the cartridge is reusable, the machine would proceed with servicing and refilling the cartridge, and send the filled cartridge to the second-hand compartment 18. If the cartridge is not reusable, it would be sent to the recycle compartment 19. In this way, those cartridges that are discarded by users who do not want refilling service, but are still reusable, would be refilled by the machine and made available for purchase.

Figure 6:
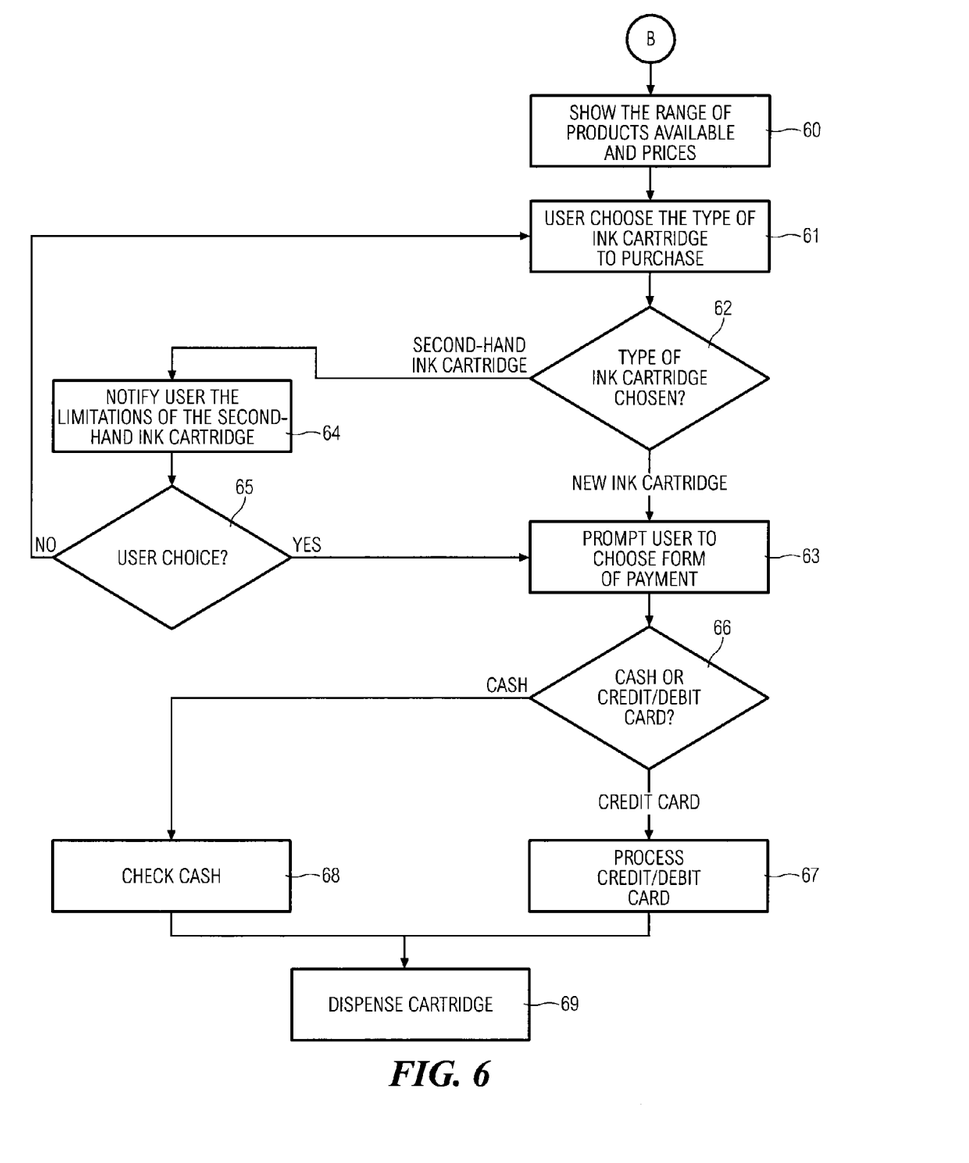
FIG. 6 is a flowchart illustrating a purchase subroutine according to an embodiment of the present invention

Referring to FIG. 6, the purchase subroutine begins with the display unit presenting a range of ink cartridges available for purchase and the corresponding sale prices before and after a rebate (step 60). The available cartridges include new cartridges as well as second-hand cartridges. The second-hand cartridges, which are stored in the compartment 18, include unwanted but acceptable cartridges that have been discarded by the users at the vending machine. The supply of second-hand cartridges may also come from other machines which have an excess of these second-hand cartridges. In this way, vending machines with no or very few second-hand cartridges can be stocked up with the overflow of second-hand cartridges from other machines.

Referring to FIG. 6, at step 61, the user selects the type of ink cartridge to be purchased. It is determined at step 62 whether the user selected to purchase a new ink cartridge or a second-hand cartridge. If the user selected to purchase a new ink cartridge, the display unit prompts the user to select the form of payment and to insert the payment (step 63). If a second-hand ink cartridge is selected (step 62), the display unit notifies the user of the limitations of the second-hand cartridge (step 64). The user is then prompted to decide whether the user still wants to proceed with this purchase (step 65). If the user chooses "yes," the vending machine proceeds to step 63. If the user chooses "no" at step 65, the vending machine returns to step 61. Whether the form of payment is cash or credit/debit card is determined at step 66. If credit/debit card payment is selected, the transactional unit proceeds with validating and processing the credit/debit card (step 67). Subsequently, the vending machine dispenses a new ink cartridge (step 69). For cash payment, the amount of cash inserted by the user is checked by the transaction unit (step 68) before the ink cartridge is dispensed (step 69).

The vending machine of the present invention provides an automated way of refilling ink cartridges as well as a convenient way of purchasing new and second-hand ink cartridges. Moreover, the vending machine provides the user with the option of buying cheaper, second-hand ink cartridges, and enables the user to trade in old ink cartridges for purchase rebates and vouchers. Consequently, the user benefits from lower ink cost and lower administrative cost for purchasing.

While particular embodiments of the present invention have been described, it will be understood by those skilled in the art that modifications and substitutions can be made without departing from the scope of the invention as set forth in the following claims.

What is claimed is:

1. A vending machine, comprising:
   a receptacle for receiving an ink cartridge;
   an ink refilling unit; and
   a diagnostic unit configured to determine whether the cartridge is empty of ink and to determine nozzle health of the ink cartridge in response to determining that the cartridge is not empty of ink;
   wherein the ink refilling unit is configured to at least partially fill the ink cartridge before the diagnostic unit determines the nozzle health of the ink cartridge in response to the diagnostic unit determining that ink cartridge is empty of ink.

2. The vending machine of claim 1, wherein the ink refilling unit is further configured to fill at least a remainder of the ink cartridge in response to the diagnostic unit determining that the nozzle health of the ink cartridge is okay by determining that a number of malfunctioning nozzles does not exceed a threshold number.

3. The vending machine of claim 2, wherein the vending machine is configured to:
   offer the cartridge with at least its remainder filled for sale as a second-hand-cartridge in response to the ink refilling unit filling at least the remainder of the ink cartridge as part of the vending machine performing a user-selected recycling subroutine; and
   dispense the cartridge with at least its remainder filled to the user as part of the vending machine performing a user-selected refilling subroutine.

4. The vending machine of claim 1, wherein the diagnostic unit is further configured to service the print head to recover bad nozzles of the print head when the diagnostic unit determines that the print head has a number of bad nozzles above a certain threshold number and that the print head has not been serviced previously, wherein the ink refilling unit is further configured to fill at least a remainder of the ink cartridge in response to the diagnostic unit determining that the number of bad nozzles is not greater than the certain threshold number.

5. The vending machine of claim 1, wherein the diagnostic unit is further configured to determine whether bad nozzles can be masked by nozzle replacement based on the location of the bad nozzles when the diagnostic unit determines that the print head has a number of bad nozzles above a certain threshold number and that the print head has been serviced previously, wherein the diagnostic unit is further configured to send the cartridge to a recycle compartment of the vending machine in response to the diagnostic unit determining that the bad nozzles cannot be masked by nozzle replacement.

6. The vending machine of claim 5, wherein the ink refilling unit is further configured to fill at least a remainder of the ink cartridge in response to a user instructing the vending machine to instruct the ink refilling unit to fill at least the remainder of the ink cartridge when the diagnostic unit determines that the bad nozzles can be masked by nozzle replacement.

7. The vending machine of claim 1, further comprising a data storage device that stores at least a number of times a cartridge has been filled.

8. The vending machine of claim 1, further comprising a monetary transactional unit configured to process payments, calculate rebates, and issue vouchers.

9. The vending machine of claim 1, further comprising mechanisms for cleaning a printhead of the ink cartridge.

10. The vending machine of claim 1, wherein the vending machine is configured to dispense new cartridges in response to receiving monetary compensation from a user.

11. The vending machine of claim 1, further comprising a drop detector.

12. The vending machine of claim 11, further comprising a driver electronic board electrically coupleable to the cartridge for supplying electrical signals to the cartridge that cause the nozzles of the cartridge to spray ink onto the drop detector.

13. A vending machine, comprising:
a receptacle for receiving an ink cartridge;
an ink refilling unit;
a diagnostic unit configured to determine whether the cartridge is empty of ink and to determine nozzle health of the ink cartridge in response to determining that the cartridge is not empty of ink; and
a display unit configured to present a user with the options of refilling a used cartridge, purchasing a filled cartridge, and returning a used cartridge;
wherein the ink refilling unit is configured to at least partially fill the ink cartridge before the diagnostic unit determines the nozzle health of the ink cartridge in response to the diagnostic unit determining that ink cartridge is empty of ink.

14. The vending machine of claim 13, wherein the display unit comprises a user interface.

15. The vending machine of claim 13, wherein the display unit is further configured to present to the user with a choice of receiving a purchase rebate or of receiving a discount voucher in exchange for a used cartridge.

16. A method of operating a vending machine, comprising:
receiving an ink cartridge;
determining whether the cartridge is empty of ink;
determining nozzle health of the ink cartridge in response to determining that the cartridge is not empty of ink; and
in response to determining that the ink cartridge is empty of ink, partially filling the ink cartridge before determining the nozzle health of the ink cartridge.

17. The method of claim 16, further comprising:
filling at least a remainder of the ink cartridge when the nozzle health of the ink cartridge is okay, wherein the nozzle health of the ink cartridge is okay when a number of malfunctioning nozzles does not exceed a threshold number; and
offering the cartridge with at least its remainder filled for sale as a second-hand-cartridge when the vending machine is operating in a user-selected recycle mode of operation or dispensing the cartridge with at least its remainder filled when the vending machine is operating in a user-selected refill mode of operation.

18. The method of claim 16, further comprising:
servicing the print head when the nozzle health is not okay and the print head has not been serviced previously, wherein the nozzle health of the ink cartridge is not okay when a number of malfunctioning nozzles exceeds a threshold number;
determining nozzle health of the serviced ink cartridge;
filling at least a remainder of the ink cartridge when the nozzle health of the serviced ink cartridge is okay, wherein the nozzle health of the ink cartridge is okay when the number of malfunctioning nozzles does not exceed the threshold number; and
offering the serviced cartridge with at least its remainder filled for sale as a second-hand-cartridge when the vending machine is operating in a user-selected recycle mode of operation or dispensing the serviced cartridge with at least its remainder filled when the vending machine is operating in a user-selected refill mode of operation.

19. The method of claim 16, further comprising:
determining whether the cartridge can be reused when the nozzle health is not okay and the print head has been serviced previously, wherein the nozzle health of the ink cartridge is not okay when a number of malfunctioning nozzles exceeds a threshold number;
filling at least a remainder of the ink cartridge when it is determined that the cartridge can be reused in response to a user input; and
offering the cartridge with at least its remainder filled for sale as a second-hand-cartridge when the vending machine is operating in a user-selected recycle mode of operation or dispensing the cartridge with at least its remainder filled when the vending machine is operating in a user-selected refill mode of operation.

20. The method of claim 19, further comprising discarding the cartridge without filling at least a remainder of the cartridge when it is determined that the cartridge cannot be reused.

* * * * *